(12) United States Patent
Cherepy et al.

(10) Patent No.: US 9,255,995 B2
(45) Date of Patent: *Feb. 9, 2016

(54) GAMMA RAY SPECTROSCOPY EMPLOYING DIVALENT EUROPIUM-DOPED ALKALINE EARTH HALIDES AND DIGITAL READOUT FOR ACCURATE HISTOGRAMMING

(71) Applicant: Lawrence Livermore National Security, LLC, Livermore, CA (US)

(72) Inventors: Nerine Jane Cherepy, Oakland, CA (US); Stephen Anthony Payne, Castro Valley, CA (US); Owen B. Drury, Rio Vista, CA (US); Benjamin W. Sturm, Berkeley, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,112

(22) Filed: Oct. 27, 2014

(65) Prior Publication Data

US 2015/0219770 A1 Aug. 6, 2015

Related U.S. Application Data

(63) Continuation of application No. 12/940,486, filed on Nov. 5, 2010, now Pat. No. 8,884,233.

(60) Provisional application No. 61/258,506, filed on Nov. 5, 2009.

(51) Int. Cl.
*G01T 1/20* (2006.01)
*G01T 1/208* (2006.01)

(52) U.S. Cl.
CPC .. *G01T 1/20* (2013.01); *G01T 1/208* (2013.01)

(58) Field of Classification Search
CPC .......... G01T 1/202; G01T 1/2018; G01T 1/20
USPC ......................................................... 250/362
See application file for complete search history.

(56) References Cited

U.S. PATENT DOCUMENTS

| 3,373,279 | A | 3/1968 | Hofstadter |
| 6,459,086 | B1 * | 10/2002 | Kline et al. ............... 250/370.13 |
| 6,587,814 | B1 | 7/2003 | Warburton et al. |

(Continued)

OTHER PUBLICATIONS

Xie et al., "Potentials of Digitally Sampling Scintillation Pulses in Timing Determination in PET," IEEE Trans Nucl Sci., vol. 56, No. 5, 2009, pp. 2607-2613.

*Primary Examiner* — Marcus Taningco
(74) *Attorney, Agent, or Firm* — Zilka Kotab

(57) ABSTRACT

According to one embodiment, a scintillator radiation detector system includes a scintillator, and a processing device for processing pulse traces corresponding to light pulses from the scintillator, where the processing device is configured to: process each pulse trace over at least two temporal windows and to use pulse digitization to improve energy resolution of the system. According to another embodiment, a scintillator radiation detector system includes a processing device configured to: fit digitized scintillation waveforms to an algorithm, perform a direct integration of fit parameters, process multiple integration windows for each digitized scintillation waveform to determine a correction factor, and apply the correction factor to each digitized scintillation waveform.

17 Claims, 3 Drawing Sheets

(56) References Cited

U.S. PATENT DOCUMENTS

| | | |
|---|---|---|
| 7,065,473 B2 | 6/2006 | Warburton et al. |
| 7,655,919 B1* | 2/2010 | Shah et al. ............... 250/370.11 |
| 8,884,233 B2 | 11/2014 | Cherepy et al. |
| 2004/0262530 A1* | 12/2004 | Reber et al. .................. 250/395 |
| 2006/0197027 A1* | 9/2006 | Dorenbos et al. ......... 250/370.11 |
| 2007/0290136 A1* | 12/2007 | Ivan .......................... 250/361 R |
| 2009/0074281 A1* | 3/2009 | McFarland et al. ........... 382/131 |
| 2010/0044576 A1* | 2/2010 | Payne et al. .............. 250/370.11 |
| 2010/0268074 A1* | 10/2010 | Van Loef et al. .............. 600/431 |
| 2011/0192981 A1* | 8/2011 | Menge et al. ................. 250/362 |
| 2012/0153164 A1 | 6/2012 | Cherepy et al. |

* cited by examiner

GAMMA RAY SPECTROSCOPY EMPLOYING DIVALENT EUROPIUM-DOPED ALKALINE EARTH HALIDES AND DIGITAL READOUT FOR ACCURATE HISTOGRAMMING

RELATED APPLICATIONS

This application is a continuation of U.S. patent application Ser. No. 12/940,486 filed on Nov. 5, 2010, which claims priority to provisional U.S. Patent Appl. No. 61/258,506 filed on Nov. 5, 2009, each of which is herein incorporated by reference and from each of which priority is claimed.

The United States Government has rights in this invention pursuant to Contract No. DE-AC52-07NA27344 between the United States Department of Energy and Lawrence Livermore National Security, LLC for the operation of Lawrence Livermore National Laboratory.

FIELD OF THE INVENTION

The present invention relates to spectroscopy, and more particularly to spectroscopy systems and methods using digital pulse readout.

BACKGROUND

Detection and classification of gamma ray emitters has attained heightened importance in the protection of vulnerable targets and populaces from special nuclear materials. Many fissionable special nuclear materials emit gamma rays, due to radioactive decay of the elements therein. However, many less harmful and non-fissionable materials also emit gamma rays. Therefore, it is desirable to be able to identify, and whenever possible, distinguish between the types of gamma ray emitters in an unknown material, possibly further concealed inside of a container or vehicle of some type, such as a car, van, cargo container, etc.

Many types of materials emit gamma rays that appear very close together in a gamma spectrum. Scintillator detectors use materials that emit bursts of light when gamma rays interact with the atoms in the scintillator material. The amount of light emitted can be used to identify the isotope that is emitting the gamma rays. Scintillator detectors may also be used to detect other types of radiation, such as alpha, beta, neutron and x-rays. High energy resolution scintillator detectors are useful for resolving closely spaced gamma ray lines in order to distinguish between different gamma-emitting radioisotopes.

Detection sensitivity for weak gamma ray sources and rapid unambiguous isotope identification is principally dependent on energy resolution, and is also enhanced by a high effective atomic number of the detector material. Generally, gamma ray detectors are characterized by their energy resolution. Resolution can be stated in absolute or relative terms. For consistency, all resolution terms are stated in relative terms herein. A common way of expressing detector resolution is with Full Width at Half Maximum (FWHM). This equates to the width of the gamma ray peak on a spectral graph at half of the highest point on the peak distribution.

The relative resolution of a detector may be calculated by taking the absolute resolution, usually reported in keV, dividing by the actual energy of the gamma ray also in keV, and multiplying by 100%. This results in a resolution reported in percentage at a specific gamma ray energy. The inorganic scintillator currently providing the highest energy resolution is $LaBr_3(Ce)$, about 2.6% at 662 keV, but it is highly hygroscopic, its growth is quite difficult and it possesses natural radioactivity due to the presence of primordial $^{138}La$ that produces betas and gamma rays resulting in interference in the gamma ray spectra acquired with $LaBr_3(Ce)$. Therefore, it would be desirable to have a scintillator detector system that is capable of distinguishing between weak gamma ray sources that is more easily grown while still providing high energy resolution.

Europium-doped Strontium Iodide is a high light yield scintillator with excellent light yield proportionality and physical properties amenable to low cost, facile crystal growth, such as low melting point, unity distribution coefficient for the Eu dopant and modest anisotropy. However, its decay time of ~1 microsecond results in difficulty in accurate pulse readout with traditional analog pulse shaping electronics. In addition, the overlap between the Eu2+ absorption and emission spectra, and the requirement for high Eu2+ doping to achieve the highest light yield crystals, results in lengthening of the effective decay times. Most commercial gamma spectroscopy radioisotope identifiers utilize direct numerical integration implemented with analog electronics.

SUMMARY

According to one embodiment, a scintillator radiation detector system includes a scintillator, and a processing device for processing pulse traces corresponding to light pulses from the scintillator, where the processing device is configured to: process each pulse trace over at least two temporal windows and to use pulse digitization to improve energy resolution of the system.

According to another embodiment, a scintillator radiation detector system includes a processing device configured to: fit digitized scintillation waveforms to an algorithm, perform a direct integration of fit parameters, process multiple integration windows for each digitized scintillation waveform to determine a correction factor, and apply the correction factor to each digitized scintillation waveform.

Other aspects and embodiments of the present invention will become apparent from the following detailed description, which, when taken in conjunction with the drawings, illustrate by way of example the principles of the invention.

DETAILED DESCRIPTION

Figure 1:
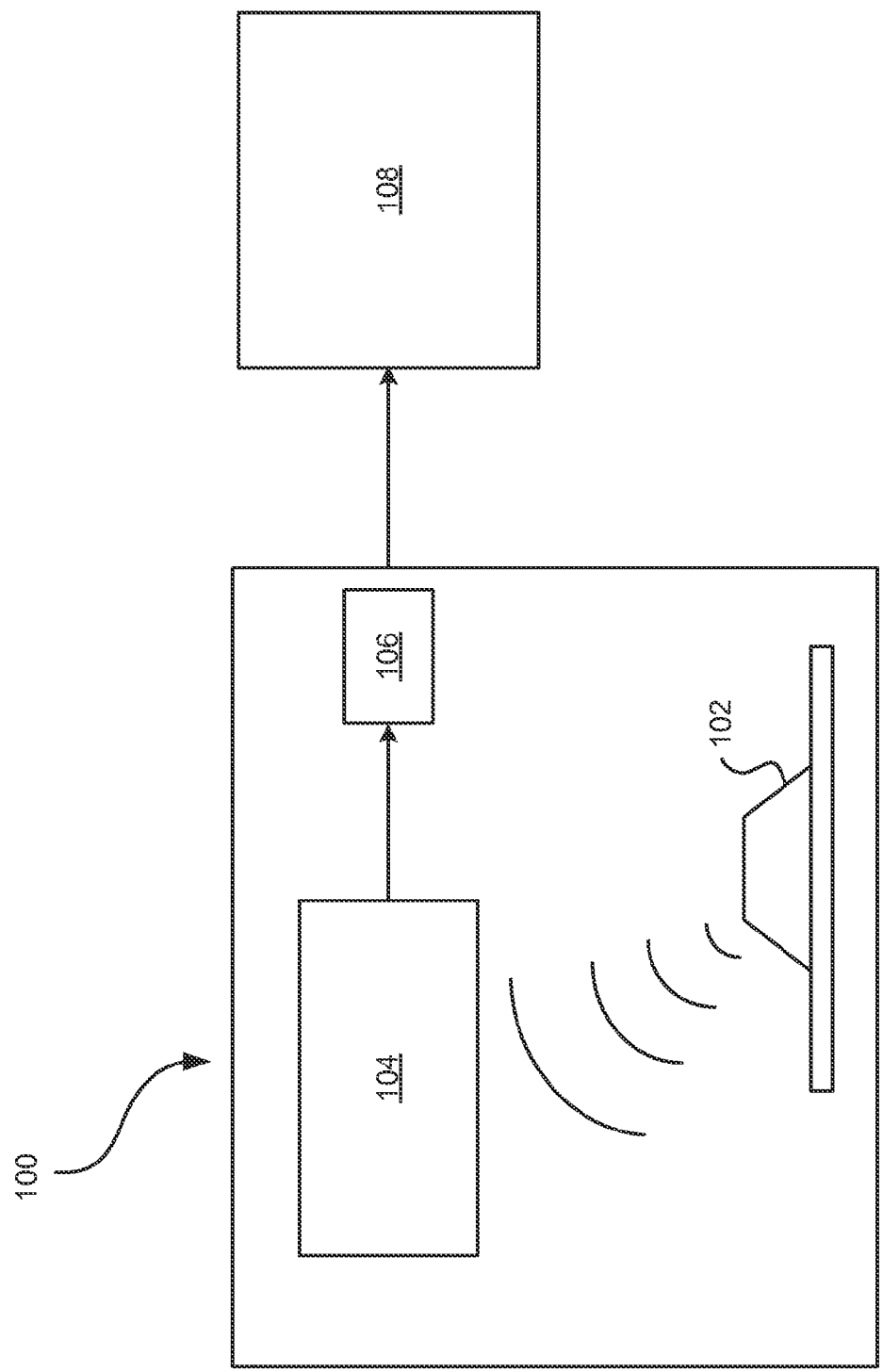
FIG. 1 is a simplified schematic layout of a spectroscopy system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used the specification and the appended claims, the singular forms "a," "an" and "the" include plural referents unless otherwise specified.

The following description describes several embodiments relating to the use of divalent Europium-doped alkaline earth halides, such as $SrI_2(Eu)$, in scintillator-based gamma ray spectrometers. For Eu-doped scintillators, digital pulse processing provides readout methodology for achieving higher energy resolution, compared to standard analog techniques. In particular, with the use of analog readout, small crystals offer energy resolution as good as 2.6% at 662 keV, however large crystals (>1 $cm^3$) evidence much worse resolution, in part due to emission, reabsorption, and re-emission events. Implementation of digital pulse analysis and histogramming greatly improves the achievable energy resolution for a given crystal, for example, from ~6% to ~3% (at 662 keV) for cubic inch-scale crystals.

Strontium Iodide doped with Europium is a scintillator offering good density, e.g., about 4.6 $g/cm^3$, and equivalent or higher light yields than $LaBr_3(Ce)$. The $Eu^{2+}$ activator typically produces luminescence in the 410-450 nm region with a decay time of about 1000 ns (1 μs) in wide band-gap scintillators. The $Eu^{2+}$ ion also has significant overlap between its electronic absorption and emission bands. These properties lead to a propensity for scintillation photons to be re-absorbed and re-emitted during transit to the photodetector, especially in large and/or highly-doped scintillator materials. This is problematic for scintillation pulse readout methods that attempt to completely integrate the scintillation pulses and are optimized for the case where all scintillation pulses have similar decay times, such as when most analog pulse shaping methods are used.

Modern digitizers operate at a sample rate well-matched to the decay time of $Eu^{2+}$, allowing accurate acquisition of decay traces from $Eu^{2-}$-doped scintillators. The inventors have found that the use of digital signal processing algorithms that analyze each scintillation pulse shape can be employed to more accurately estimate the pulse integrals, enabling significant improvements in histogramming and the resultant achievable energy resolution tier a given crystal used in a gamma ray spectroscopy system.

In one general embodiment, a scintillator radiation detector system includes a scintillator; and a processing device for processing pulse traces corresponding to light pulses from the scintillator, wherein pulse digitization is used to improve energy resolution of the system.

In another general embodiment, a scintillator radiation detector system according to another embodiment includes a processing device for fitting digitized scintillation waveforms to an algorithm based on identifying rise and decay times and performing a direct integration of fit parameters.

In another general embodiment, a method includes processing pulse traces corresponding to light pulses from a scintillator, wherein pulse digitization is used to improve energy resolution of the system.

In yet another general embodiment, a method includes fitting digitized scintillation waveforms to an algorithm based on identifying rise and decay times; and performing a direct integration of fit parameters.

General Scintillator-Based Radiation Detector System

FIG. 1 depicts a simplified spectroscopy system according to one embodiment. The system 100 comprises a scintillator 102, such as of a type described herein, and which is typically crystalline. Scintillators may also be referred to as scintillator optics, scintillator crystals, etc. The system 100 also includes a photodetector 104, such as a photomultiplier tube, which can detect light emitted from the scintillator 102, and detect the response of the material to at least one of neutron and gamma ray irradiation.

The scintillator 102 produces light pulses upon occurrence of an event, such as a gamma ray or other radiation engaging the scintillator 102. As the gamma ray, for example, traverses the scintillator 102, photons are released, appearing as light pulses emitted from the scintillator 102. The light pulses are detected by the photodetector 104 and transduced into electrical signals that correspond to the pulses. The type of radiation can then be determined by analyzing the integral of the light pulses and thereby identifying the gamma ray energy absorbed by the scintillator.

In some embodiments, the system 100 may be, further comprise, or be coupleable/coupled to, a processing device 106 for processing pulse traces output by the photodetector 104. In other embodiments, the system 100 may include a processing device that receives data from a photodetector that is not permanently coupled to the processing device. Illustrative processing devices include microprocessors, field programmable gate arrays (FPGAs), application specific integrated circuits (ASICs), computers, etc.

The result of the processing may be output and/or stored. For example, the result may be displayed on a display device 108 in any form, such as in a histogram or derivative thereof.

In particularly preferred embodiments, pulse digitization followed by the use of a processing algorithm is used to improve energy resolution of the scintillator to <4% at 662 keV.

Scintillator Materials

Various embodiments may employ any known scintillator material.

Several materials have been found to have special utility as gamma spectroscopy scintillators, among them are Eu-doped alkaline earth halides such as $SrI_2(Eu)$ and $BaI_2(Eu)$, and mixtures thereof. Particularly preferred are the compositions disclosed in U.S. patent application Ser. No. 12/255,375 filed on Oct. 21, 2008, which is herein incorporated by reference.

In one embodiment, a scintillator detector makes use of an alkaline earth halide, comprised, e.g., of (Ba, Sr, and/or Ca)(F, Br and/or, I)$_2$ for the purpose of gamma ray detection, based on measuring the amount of scintillation luminescence generated by the material. For this purpose, the crystal may be doped or undoped, giving rise to excitonic (undoped), perturbed excitonic (e.g., Na, Mg, Ca, Sc or other doping of electronically inactive species), or activator luminescence (e.g., $Eu^{2+}$, $Ce^{3+}$, $Pb^{2+}$, $Tl^+$, $Pr^{3+}$, Bi3+).

Several crystalline iodides are known to function usefully as scintillators, including NaI(Tl), CsI(Na), CsI(Tl), BGO ($Bi_4Ge_3O_{12}$), BaF2, CaF2(Eu) and certain plastics, organic crystals and liquids. NaI(Tl) is by far the most common scintillator used in gamma ray spectroscopy, being grown in large sizes by numerous companies and deployed in many commercial instruments.

Other illustrative compounds useful as scintillators include Ce-doped $LaCl_3$ and $LaBr_3$, which both have very high light yields.

As noted above and below, the methods presented herein enable use of large crystals (>1 $cm^3$) in scintillator radiation detector systems. Large crystals usable in various embodiments may include those having a volume of >1 $cm^3$, >2 $cm^3$, >5 $cm^3$, >10 $cm^3$, >15 $cm^3$, >20 $cm^3$, etc.

The techniques described herein are enabling technologies that make it possible to utilize larger crystals, such as large volume Strontium Iodide crystals doped with Europium because problems associated with varying scintillation decay times are eliminated. One issue that, prior to this invention, has hampered implementation of europium doped crystals is that as the crystals become larger, the effective decay time of the scintillation pulses becomes longer as well. In fact, it is not just that the pulses get longer, the dispersion of the pulse decay times becomes larger, i.e., some of the pulses are emitted more e quickly than others, and this has to do with photons in the crystal being reabsorbed and reemitted by the europium. Moreover, the decay time of europium is already relatively slow compared to many other scintillators. Accordingly, the larger the volume, the more likely that photons generated on one end of the crystal will be reabsorbed and reemitted by europium ions before the photons can reach the photo detector. This leads to an effectively longer pulse decay time. However, using the techniques presented herein, problems previously associated with noise, e.g. occurrence of a second event during the tail of the current event, inability to measure accurately the scintillation near the end of the decay due to photodetector and circuit noise, etc. are minimized or eliminated.

Analog Methods

Traditional systems use an analog method for processing the signals from the photodetector, which works well in certain cases, but is limited in how long the pulses can be for the integrated pulse obtained via analog electronics to still be accurate. For example, in an ideal analog system, all of the photons that are emitted from the scintillator from a gamma absorption event are counted. However, phenomena such as reabsorption events of photons in the scintillator material, and perhaps exacerbated by a long effective scintillation decay time of the scintillator material itself, may require integrating out to times longer than generally allowable for properly functioning analog pulse shaping to be applied (~12 microseconds) to make sure that every last photon has exited the scintillator. This results in generation of an extended "tail" in the histogram of the data, known as a "pulse height spectrum". Moreover, extended integration is undesirable due to parallel noise, potential arrival of a new pulse before that tail is done, etc., all of which may cause errors, decrease resolution, etc.

Pulse Height Spectra—Digital Methods

Various techniques employing digital-based histogram generation may be used according to various embodiments.

According to one general embodiment, e scintillation pulse traces (raw or derivatives thereof) from the photodetector are collected, optionally stored (at least transitionally e.g., in a cache), and analyzed as though they are a single exponential rise and a single exponential decay. Particularly the decay behavior of the scintillator material is predictable, and can be fit to exponential functions, even though it varies from pulse to pulse. Knowing this predictability, a single exponential may be used. Thus, though the absolute decay time varies from pulse to pulse due to the intrinsic properties of the materials, the technique is powerful because it eliminates the need to integrate long tails.

For example, one embodiment assumes a functional form for the temporal shape of the light burst, which is an exponential, and then fits this digitally accumulated data to an exponential. Once it is fit to an exponential, which is in analytical form, the integral may be determined without waiting for all photons to arrive; rather the parameters that describe that exponential are used.

The inventors have surprisingly found that this technique is more accurate than attempting to brute, force numerically integrate the pulse and to determine how many photons were generated. By assuming that the cumulative data needs to have a single exponential decay and fitting the points from the beginning of the decay, more accuracy is obtained.

In one approach, an "Aτ algorithm," where the decays are fit and then analytically integrated, is used to improve scintillator detector resolution. The Aτ algorithm in one embodiment is implemented as follows. Digital scintillation traces are acquired and processed in order to fit each trace to exponential rise and decay:

$$A[\exp(-t/\tau_D)-\exp(-t/\tau_R)] \quad \text{(Equation 1)}$$

where A is the amplitude of the pulse trace signal (e.g., from the photodiode), t is ti sampling period, $\tau_D$ is the decay time, and $\tau_R$ is the rise time.

The integral of Equation 1 is simply:

$$A(\tau_D-\tau_R) \quad \text{(Equation 2)}$$

The as-processed integral pulses can then be histogrammed and the energy resolution analyzed.

Figure 2:
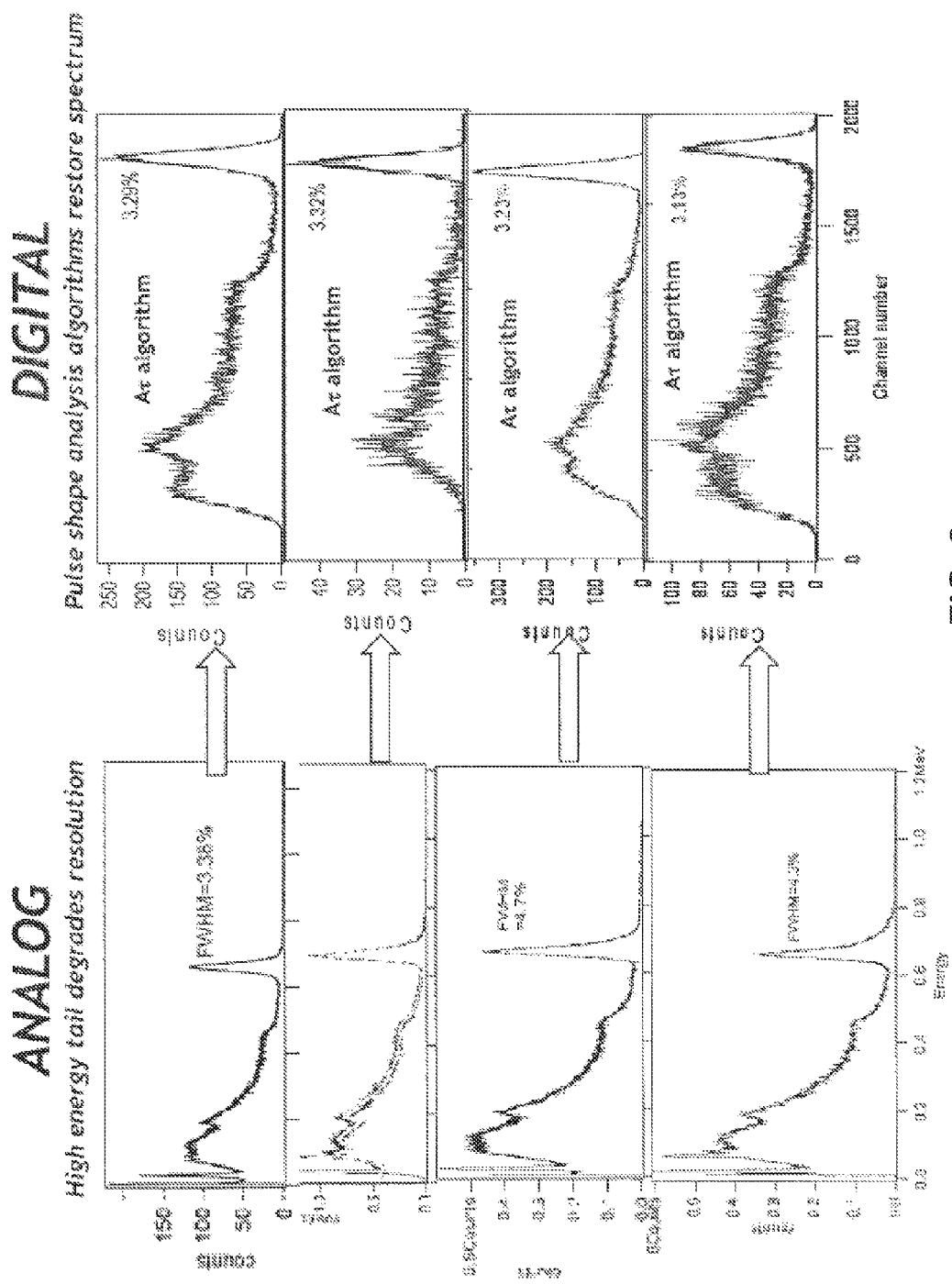
FIG. 2 is a depiction of plots of pulse processing using analog and digital techniques for four scintillator samples.

FIG. 2 shows the pulse height spectra of four $SrI_2(Eu)$ crystals acquired by analog techniques and the pulse height spectra determined from digital pulse acquisition and processing with the Aτ algorithm, shown in Equation 2. Particularly, the gamma ray pulse-height spectra of the 662 keV line of a Cs-137 radioactive source were acquired with four different Europium-doped Strontium Iodide crystals using standard analog electronic. The full absorption peaks were processed with a Gaussian fit procedure to evaluate the peak position and the peak full width at half maximum, in order to estimate the energy resolution.

In FIG. 2, the left column of charts shows data acquired using analog methods and 8 μs shaping time. With continued reference to FIG. 2, the right column shows the pulse height spectra resulting from fitting the scintillation decay traces to a double exponential (single exponential rise, single exponential decay) evidencing significant improvements in energy resolution. The size of each crystal associated with the data from top to bottom was 9.1 cm³, 14.5 cm³, 12.3 cm³, and 8.6 cm³ respectively.

Referring again to FIG. 2, the energy resolution at 662 keV of 4-5% was measured for $SrI_2(Eu)$ with analog acquisition, while for the same crystals, the energy resolution was improved to <4%, and more particularly to between 3% and 3.5%, using the digital approach.

Figure 3:
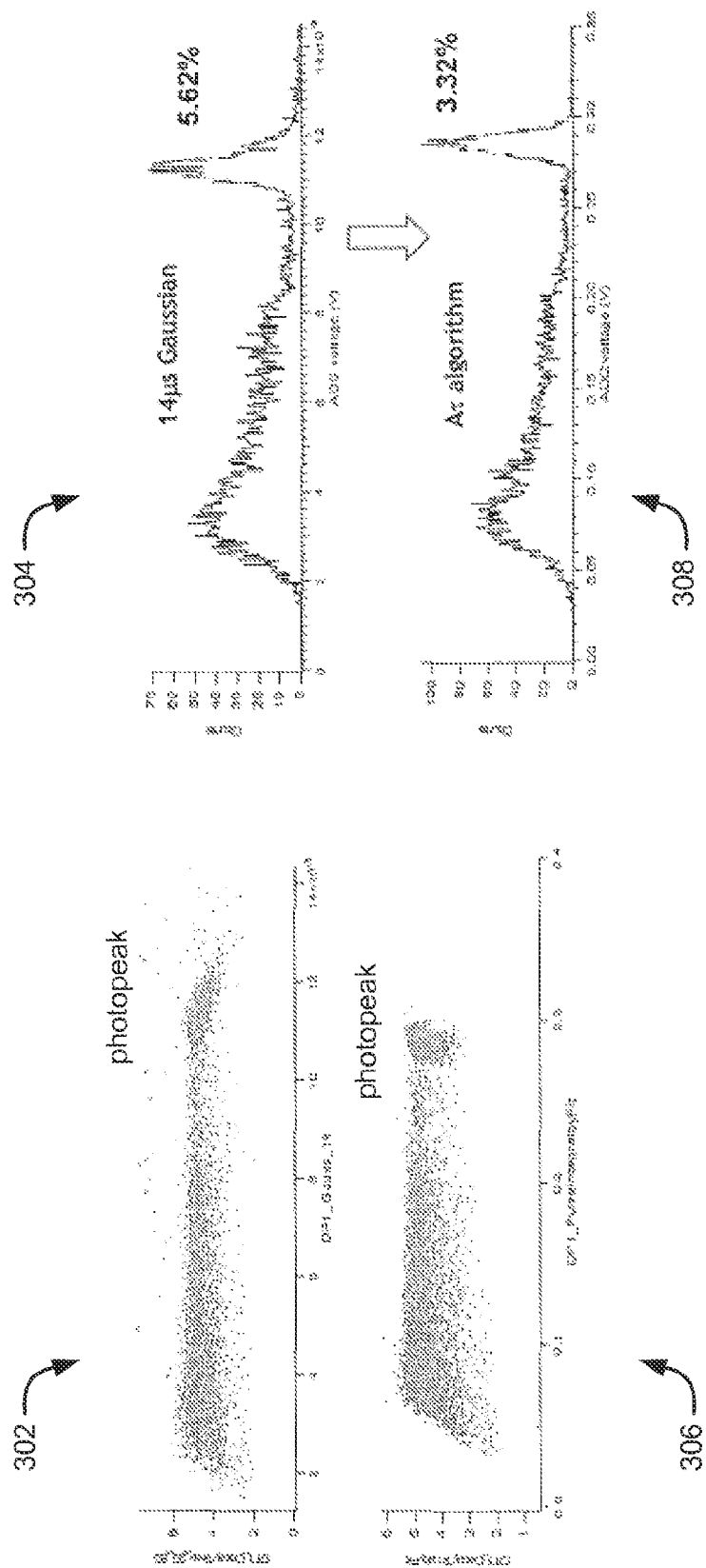
FIG. 3 is a depiction of plots of comparative analog and digital processing of pulses.

FIG. 3 illustrates comparative analog and digital processing of a cesium 137 pulse height spectrum, the main feature of which is a 662 keV gamma ray. In chart 302, each of the dots corresponds to an event. The ordinate axis on the left is the measured lifetime of the scintillation decays, white the abscissa is the pulse height, generally corresponding to the number of photons in each event. The pulse decay distribution plotted as a function of the pulse integrals in chart 304, shows that with typical Gaussian shaping for pulse integration, the photopeak has a degraded shape. Note how the tail of the plot in chart 302 extends to the right. As shown in chart 304, the corresponding pulse height spectrum produces an energy resolution of 5.62%.

Referring to chart 306, when the Aτ algorithm is used, the photopeak is essentially "fixed" and shows a symmetric distribution, while the pulse height spectrum depicted in chart 308 is also essentially "fixed" producing 3.32% resolution. This improved resolution is a significant improvement over the 5.62% obtained using the analog method. The photopeak and how accurately it can be determined (i.e. its energy resolution) is critical, because that permits identification of closely-spaced gamma ray energies.

Thus, rather than numerical integration of the scintillation pulse signals, this technique takes a functional form, knowing it should be a single exponential decay, and fits the data to the functional form that is a single exponential and that provides an accurate estimate of how many photons were in each of those pulses without detecting all photons, regardless of whether the effective decay tithe is long.

In another digital processing approach, signals corresponding to a subset of the events are selected and processed.

Yet another approach includes processing two or more integration windows (e.g., $0\text{-}\tau_1$, $\tau_1\text{-}\tau_2$), and employing this ratio to deduce a correction factor applied to each individual scintillation pulse.

In a further approach, a technique may use templates, where pulses are classified as they come in to a certain template. Even though the tail is not fully integrated, it can be estimated based on the template, and if the top of the tail fits a certain template, then it can be assumed that it fits into this certain classification. For example, assume a 100 nanosecond pulse is output. The system adds data that is between 0 and 10 nanoseconds, between 10 and 20 nanoseconds, between 20 and 50 nanoseconds, and between 50 and 100 nanoseconds. Thus, instead of just having one number which would be adding everything up from 1 to 100, the system generates four numbers. An empirical equation known the art may be used to estimate the shape of the tail, generate a correction factor, etc. using the four numbers.

Yet another digital processing approach may involve determining the time-slopes of the decays for at least two time windows and utilizing this information to correct the integrated value of the light pulse.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The program environment in which one embodiment of the invention may be executed illustratively incorporates one or more general-purpose computers or special-purpose devices such hand-held computers. Details of such devices (e.g., processor, memory, data storage, input and output devices are well known and are omitted for the sake of clarity.

It should also be understood that the techniques of the present invention might be implemented using a variety of technologies. For example, the methods described herein may be implemented in software running on a computer system, or implemented in hardware utilizing one or more processors and logic (hardware and/or software) for performing operations of the method, application specific integrated circuits, programmable logic devices such as Field Programmable Gate Arrays (FPGAs), and/or various combinations thereof. In particular, methods described herein may be implemented by a series of computer-executable instructions residing on a storage medium such as a physical (e.g., non-transitory) computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a physical computer readable medium having computer code thereon. A computer readable medium can include any physical medium capable of storing computer, code thereon for use by a computer, including optical media such as read only and writeable CD and DVD, magnetic memory or medium (e.g., hard disk drive), semiconductor memory (e.g., FLASH memory and other portable memory cards, etc.), etc.

In Use

Embodiments of the present invention may be used in a wide variety of applications, and potentially any application in which high tight yield and/or high resolution is useful.

Illustrative uses of various embodiments of the present invention include, but are not limited to, applications requiring radiation detection. Search, surveillance and monitoring of radioactive materials are a few such examples. Various embodiments can also be used in the nuclear fuel cycle, homeland security applications, nuclear non-proliferation, medical imaging, high energy physics facilities, etc.

Yet other uses include detectors for use in treaty inspections that can monitor the location of nuclear missile warheads in a nonintrusive manner. Further uses include implementation in detectors on buoys for customs agents at U.S. maritime ports, cargo interrogation systems, and instruments that emergency response personnel can use to detect or search for a clandestine nuclear device. Assessment of radiological dispersal devices is another application.

Further embodiments may include medical radiation detectors, e.g., to identify radioactive isotopes in patients (e.g. PET scanners) and for x-ray radiography.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A scintillator radiation detector system, comprising:
   a scintillator; and
   a processing device for processing pulse traces corresponding to light pulses from the scintillator, wherein the processing device is configured to: process each pulse trace over at least two temporal windows and to use pulse digitization to improve energy resolution of the system.

2. The scintillator radiation detector system of claim 1, wherein the processing device is further configured to: determine a correction factor based on processing the at least two temporal windows and apply the correction factor to each pulse trace.

3. The scintillator radiation detector system of claim 1, wherein the processing device is configured to fit each pulse trace using an algorithm to process the pulse traces, wherein the algorithm includes fitting each of the pulse traces to at least an exponential decay.

4. The scintillator radiation detector system of claim 3, wherein the processing device is further configured to perform an analytic integration of parameters describing the exponential decay.

5. The scintillator radiation detector system of claim 3, wherein the algorithm further includes fitting each of the pulse traces to an exponential rise and the exponential decay.

6. The scintillator radiation detector system of claim 5, wherein the processing device is further configured to perform an analytic integration of parameters describing the exponential rise and the exponential decay.

7. The scintillator radiation detector system of claim 1, wherein the pulse digitization improves the energy resolution of the system at 662 keV by at least 0.3%.

8. The scintillator radiation detector system of claim 1, wherein the energy resolution of the system at 662 keV is less than 4%.

9. The scintillator radiation detector system of claim 1, wherein the scintillator is a europium-doped alkaline earth halide.

10. The scintillator radiation detector system of claim 1, wherein the scintillator has a volume greater than 1 cm$^3$.

11. The scintillator radiation detector system of claim 1, wherein the scintillator has a volume greater than 10 cm$^3$.

12. The scintillator radiation detector system of claim 1, wherein the processing device includes a Field Programmable Gate Array (FPGA).

13. A scintillator radiation detector system, comprising:
a processing device configured to:
fit digitized scintillation waveforms to an algorithm;
perform a direct integration of fit parameters;
process multiple integration windows for each digitized scintillation waveform to determine a correction factor; and
apply the correction factor to each digitized scintillation waveform.

14. The scintillator radiation detector system of claim 13, wherein an energy resolution of the system at 662 keV is less than 4%.

15. The scintillator radiation detector system of claim 13, wherein the algorithm includes processing at least an exponential decay for each of digitized waveform.

16. The scintillator radiation detector system of claim 13, wherein the algorithm is an A$\tau$ algorithm represented by:

$$A[\exp(-t/\tau_D) - \exp(-t/\tau_R)]$$

where A is an amplitude of a digitized scintillation waveform, t is a sampling period, $\tau_D$ is a decay time, and $\tau_R$ is a rise time.

17. The scintillator radiation detector system of claim 13, wherein the digitized scintillation waveforms are derived from light pulses from a scintillator.

* * * * *